United States Patent
Holt

(10) Patent No.: US 7,264,727 B2
(45) Date of Patent: Sep. 4, 2007

(54) SEPTIC SYSTEM REMEDIATION METHOD AND APPARATUS

(76) Inventor: Karl K. Holt, N78 W29098 Flynn Rd., Hartland, WI (US) 53029

( * ) Notice: Subject to any disclaimer, the term of this patent is extended or adjusted under 35 U.S.C. 154(b) by 136 days.

(21) Appl. No.: 10/764,245

(22) Filed: Jan. 23, 2004

(65) Prior Publication Data

US 2004/0149652 A1 Aug. 5, 2004

Related U.S. Application Data

(60) Provisional application No. 60/442,446, filed on Jan. 25, 2003.

(51) Int. Cl.
*C02F 3/00* (2006.01)
(52) U.S. Cl. ...................... 210/620; 210/220
(58) Field of Classification Search ............... 210/606, 210/620, 220, 532.2
See application file for complete search history.

(56) References Cited

U.S. PATENT DOCUMENTS

| | | | |
|---|---|---|---|
| 5,221,470 A * | 6/1993 | McKinney | 210/151 |
| 5,384,048 A | 1/1995 | Hazen et al. | |
| 5,490,935 A * | 2/1996 | Guy | 210/620 |
| 5,549,818 A * | 8/1996 | McGrew, Jr. | 210/195.4 |
| 5,810,514 A | 9/1998 | Suchecki, Jr. | |
| 6,096,203 A * | 8/2000 | Drewery | 210/170 |
| 6,159,371 A * | 12/2000 | Dufay | 210/602 |
| 6,200,470 B1 * | 3/2001 | Romero et al. | 210/170 |
| 6,475,395 B1 * | 11/2002 | Schmit et al. | 210/741 |
| 6,780,318 B2 * | 8/2004 | Fife et al. | 210/621 |
| 6,861,248 B2 * | 3/2005 | Dale et al. | 435/255.2 |
| 6,863,818 B2 * | 3/2005 | Daigger et al. | 210/616 |
| 2003/0113908 A1 * | 6/2003 | Hussey et al. | 435/296.1 |
| 2003/0234217 A1 * | 12/2003 | Perriello et al. | 210/610 |

FOREIGN PATENT DOCUMENTS

| JP | 10151480 A | * | 6/1998 |
|---|---|---|---|
| JP | 11253942 A | * | 9/1999 |

* cited by examiner

*Primary Examiner*—Chester T. Barry
(74) *Attorney, Agent, or Firm*—Joseph S. Heino; Patrick M. Bergin

(57) ABSTRACT

An apparatus and a method for the remediation of failing wastewater treatment systems, such systems being comprised of one or more septic tanks and a seepage pit, drywell, absorption field or an above grade mound system having an inlet and a plurality of outlets wherein effluent drains from the inlet to the outlet, comprises a positive pressure pump having an output, a tube having a first end and a second end, the first end being attachable to the pump output, and an air stone attachable to the second tube end. The pump is used to deliver air through the tube to the air stone. As much tube as is required is used to allow the air stone to be introduced into almost any portion of the wastewater treatment system so as to introduce air into the effluent to allow aerobic bacteria to proliferate. The apparatus could also include a plurality of such pumps, tubes and air stones, and in many combinations. The method comprises introducing oxygen to the bio-mat, introducing live aerobic bacteria to the bio-mat, monitoring the level of effluent in the absorption field or dry well, and stopping the introduction of air to the effluent when the bio-mat is sufficiently reduced or made permeable. The method could also introduce live anaerobic bacteria to the treated area after remediation equipment is removed.

20 Claims, 5 Drawing Sheets

SEPTIC SYSTEM REMEDIATION METHOD AND APPARATUS

This application claims the benefit and priority of U.S. Provisional Application No. 60/442,446 filed Jan. 25, 2003.

FIELD OF THE INVENTION

This invention relates generally to septic systems and to the components that make up such systems. More particularly, it relates to a method and to an apparatus for remediating the formation of a bio-mat that can occur in the absorption field component of a private on-site wastewater treatment system.

BACKGROUND OF THE INVENTION

Septic systems and septic system components are well known in the art. Such systems are typically found in relatively sparsely populated areas not otherwise serviced by municipal waste water systems. The purpose of a septic system is to dispose of the wastewater that is generated by the occupants of a home or other building in such a manner that surrounding soils can be used to disperse the wastewater without causing an adverse effect on ground water and, in turn, on public health and the environment in general. To accomplish this task, septic systems are normally comprised of a septic tank, a distribution system and a leaching system.

The septic tank is connected to the plumbing of a home or building by means of a sewer line. The septic tank provides a holding area for the settling of waste solids and for some initial treatment of the waste. Generally, septic tanks have baffles to slow the velocity of the liquid moving through the tank and to prevent solids from leaving the tank. In this way, properly functioning septic tanks produce an effluent of fairly uniform quality.

The effluent then moves to a distribution system that directs the flow of effluent from the septic tank to the leaching system in such a manner as to fully utilize the leaching system. Most systems take advantage of gravity, meaning that flow runs through piping and distribution boxes without the assistance of any mechanical device such as a pump.

The leaching system disperses the sewage effluent over a given underground area and into the surrounding natural soils. There are several types of leaching systems and the specific type used often depends on the surrounding soil conditions. Most residential leaching systems use stone filled leaching trenches but galleries, pits, and beds have also been used.

In the experience of this inventor, private on-site wastewater treatment systems have finite lifetimes due to many factors including household water use, excessive introduction of chemicals into the waste stream, poor maintenance, and environmental factors. Replacement of any septic system component that may be required to deal with remediation of the entire system can be extremely expensive. The reason for this is the fact that the septic system components, for the most part, are buried underground as previously described and are largely inaccessible.

A very significant factor is that passive septic systems typically rely on the presence of indigenous anaerobic bacteria to break down the solid waste introduced to the system. As solid waste enters the septic tank, it flows through the series of baffles that are designed to reduce the velocity of the flow as previously described. Generally, three identifiable layers occur in a septic tank. First, as designed, solid wastes precipitate out of the flow to the bottom of the septic tank. This layer is generally known as sludge. Liquid effluent is the intermediate layer and generally consists of liquids and solids partially broken down into liquids by the anaerobic bacteria that are present in the septic tank. This intermediate layer is drained off to the absorption field. The top layer in the septic tank is generally known as the scum layer. The scum layer is comprised of mostly residual detergents, soaps, fats and oils and has a tendency to float at the top of the septic tank. Optimally, the septic tank is designed such that only the partially treated liquid effluent is permitted to leave the septic tank for the absorption field. Unfortunately, this is not always the case.

The standard septic system is passive in that it relies on the presence of indigenous anaerobic bacteria to break down the solid wastes introduced into the system. Anaerobic bacteria thrive in conditions such as those that exist at the bottom of a septic system, where oxygen is lacking. Accordingly, septic systems are designed to have the capacity to treat a certain amount of solid wastes based on the capability of the indigenous bacteria to break down the solid waste over a certain period of time. Therefore, the average amount of solid waste produced per day should be approximately equal to the amount that the anaerobic bacteria can break down in one day.

Aerobic bacteria are also indigenous and occur naturally within the waste stream. Aerobic bacteria, however, exist and function only where oxygen is present. While aerobic bacteria typically break down solid wastes more quickly than anaerobic bacteria, they are ineffective at breaking down sludge, or the solid layer at the bottom of the septic tank, because there is no oxygen present in that layer. Due to increased installation and operating costs, aerobic systems that would otherwise eliminate this sludge layer are not favored for home use.

As anaerobic bacteria digest solids suspended in the effluent as they make their way to the absorption field or in the absorption field, the suspended solids and accompanying bacteria are then deposited at the interface between the absorption field and the soil surrounding the system. This layer is known as the "bio-mat" and it performs further filtering of the effluent. Unfortunately, the bio-mat layer can grow to a thickness where it almost completely, or almost completely, impedes absorption.

While there are many ways in which septic systems can fail, two of the most likely modes of failure include the creation and thickening of a bio-mat layer at the absorption field component of the system due to the decomposition of solids within the effluent. Excess sludge and scum from the septic tank can also build up in this bio-mat. For example, when the rate of decomposition caused by the anaerobic bacteria is incapable of keeping up with rate of solids draining into the system, the septic tank fills with sludge. As the sludge level gets higher, the scum level at the top of the tank takes up more space. This causes the liquid effluent to run through the septic tank more quickly, which prevents solids from settling. The solids that fail to settle in the septic tank proceed to the absorption system, where they frequently plug the pores in the soil used for absorption. The scum layer can also find its way out of the septic tank and similarly prevents soil absorption. And if too much of the absorption field is plugged by scum and solids, the effluent will actually back up in the absorption area and cause muddy spots in the area above the absorption field. This is a sign that the absorption field has failed, an extremely malodorous and unsightly condition.

As alluded to earlier, replacement of soil absorption systems is frighteningly costly and heavily regulated by states, counties and municipalities due to the threat that malfunctioning systems pose to the groundwater. Replacement systems are very expensive, with the actual expense depending on the condition of other components in the septic system. Some owners choose to convert their existing passive system to an active system, an even more costly endeavor. Another possible option is to create an above-grade soil absorption system. Above grade systems also have operating and maintenance expenses and those are even greater than passive systems. Holding tanks are frequently the option of last resort as they are also expensive and need to be regularly pumped by a commercial contractor.

Frequently, a failing or failed soil absorption system can be remediated with the support of naturally occurring aerobic bacteria in the system. In theory, an aerobic system could eliminate or substantially reduce the failure rate of an absorption field. Unfortunately, aerobic bacteria also require the introduction of oxygen into the waste stream. Therefore, there is a need for a temporary means for introducing oxygen into a failed or failing soil absorption field for the purpose of converting the biochemical process from an anaerobic one to an aerobic one. The forced introduction of oxygen into the system would allow the aerobic bacteria to scour the bio-mat, thereby working to reduce the thickness and/or increase the permeability of the bio-mat and permit the system to revert back to an anaerobic passive system as originally designed. There is also a need to alter the biochemical process by conversion of the complete soil absorption component or a localized area of it.

BRIEF SUMMARY OF THE INVENTION

Accordingly, the present invention provides an apparatus and a method for the remediation of failing private onsite wastewater treatment systems, such systems being comprised of a septic tank having an inlet and an outlet, in some cases, a second septic tank or pumping chamber having an inlet and an outlet and a seepage pit, drywell, absorption field or a above grade mound system having an inlet and a plurality of outlets wherein effluent drains from the inlet to the outlet. The apparatus, in its most simple form, comprises (a) a positive pressure pump having an output, (b) a tube having a first end and a second end, the first end being attachable to the pump output, and (c) an air stone attachable to the second tube end. The pump is used to deliver air through the tube to the air stone. As much tube as is required is used to allow the air stone to be introduced into almost any portion of the wastewater treatment system so as to introduce air into the effluent and allow aerobic bacteria to proliferate. The apparatus of the present invention could also include a plurality of such pumps, tubes and air stones, and in many combinations.

The present invention also provides a method for remediating failed or failing private onsite wastewater treatment systems wherein an accumulation of bio-mat has reduced the flow of effluent through the dry well or the absorption field minimally comprising the steps of (a) introducing oxygen to the bio-mat, (b) introducing live aerobic bacteria to the bio-mat, (c) monitoring the level of effluent in the absorption field or dry well, and (d) stopping the introduction of air to the effluent when the bio-mat is sufficiently reduced or made permeable. The method of the present invention could also include introducing anaerobic and/or aerobic bacteria and/or facultative bacteria to the treated area before, and/or during and/or after the remediation equipment is removed.

The foregoing and other features of the method and apparatus of the present invention will be apparent from the detailed description that follows.

BRIEF DESCRIPTION OF THE DRAWINGS

FIG. 1 is a perspective view of a typical private wastewater treatment system of the type that the method and apparatus of the present invention could be used with.

DETAILED DESCRIPTION

Figure 1:
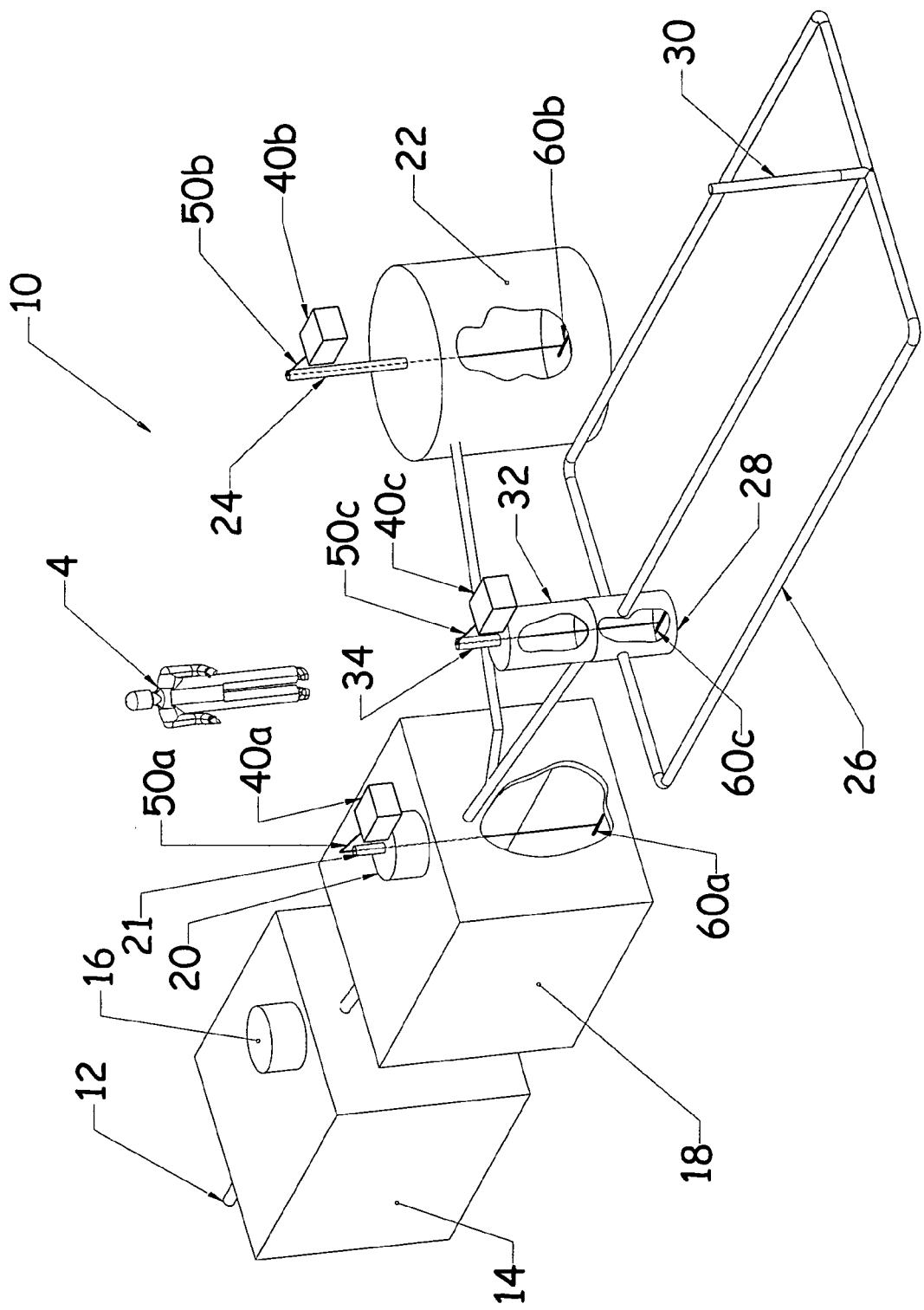

Reference is now made to the drawings wherein like numbers refer to like elements throughout. FIG. 1 illustrates a septic system, generally identified 10, with which the apparatus and method of the present invention is intended to be used. It is to be understood, however, that the precise configuration of the system is not a limitation of the present invention and could assume any number of sizes and layouts. The septic system 10 shown is for illustration purposes only. A six foot tall man 4 is included for relative size reference as well.

Figure 3:
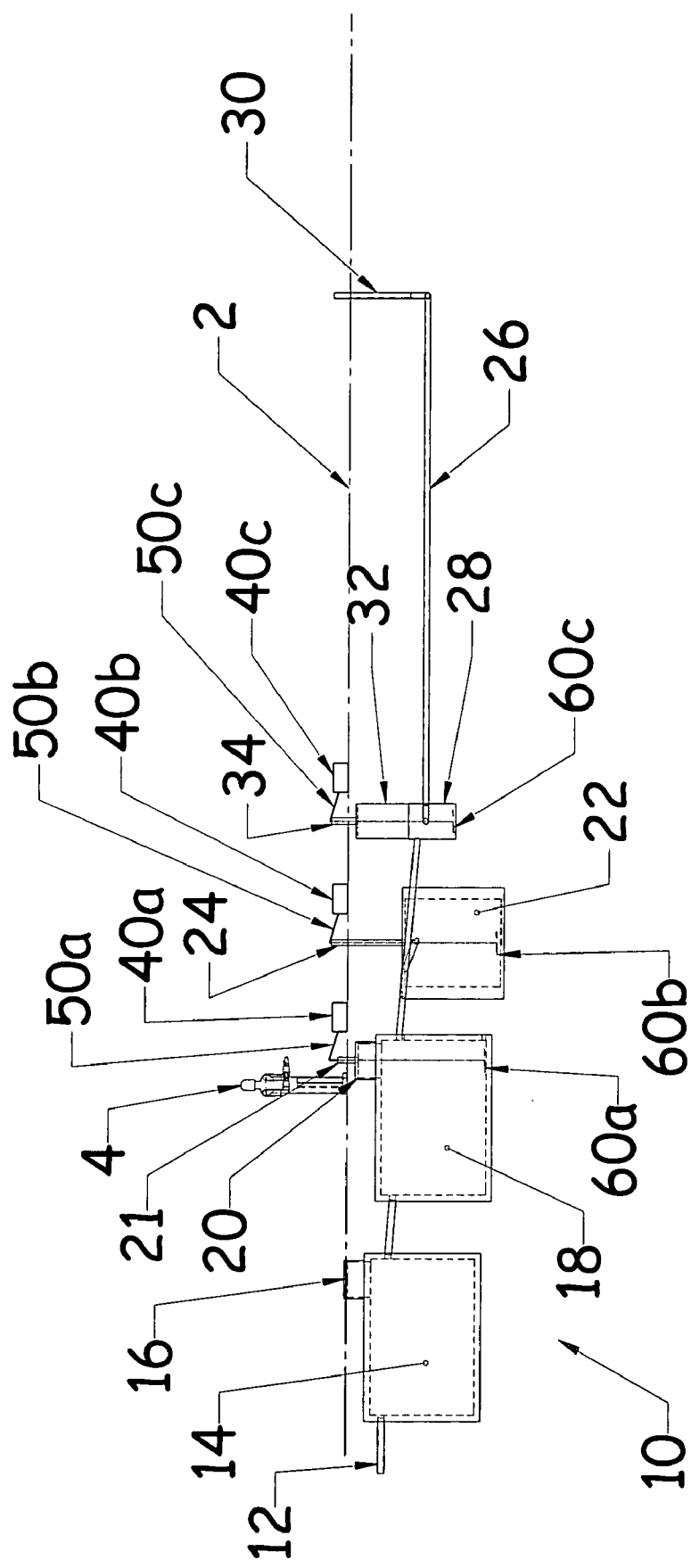
FIG. 3 is a side elevational view of the system shown in FIG. 1.

As shown in FIG. 3, the septic system 10 lies, for the most part, below earth grade 2. The system 10 includes a pipe 12 leading from a home or building (not shown) which pipe 12 is connected to a first septic tank 14. The first tank 14 may or may not have a vented cover. As shown, the first tank 14 includes a riser 16. The first tank 14 is, in turn, connected to a second tank 18. This second tank 18 may or may not have a vented cover as well. As shown, the second tank 18 includes a riser 20 and a vent 21. As will become apparent later in this detailed description, if either the first or second tanks 14, 18 do not have a vented cover atop of 16, 20, respectively, one may need to be added in order to utilize the apparatus of the present invention. This second tank 18 may also be a pumping chamber. It should also be noted that the second tank 18 lies slightly below the first tank 14 such that gravity affects a downstream flow of effluent from one tank to the other.

The second tank 18 is, in turn, connected to a dry well or seepage pit 22. The dry well or seepage pit 22 includes a vent 24. An alternate to a dry well or seepage pit 22 is an absorption field 26 or an above grade mound system (not shown). The absorption field 26 may include a distribution box 28 and a vent 30. The distribution box 28 of the absorption field 26 may or may not include a distribution box riser 32 and a distribution box vent 34. Again for reasons that will become apparent later in this detailed description, a distribution box riser 32 will likely need to be added to the system 10 if one is not already included. As shown in FIG. 3, it will be shown that the downward flow of effluent is effected by gravity. Alternatively, the effluent can be moved by a positive pressure pump to the soil distribution component of the system.

Figure 4:
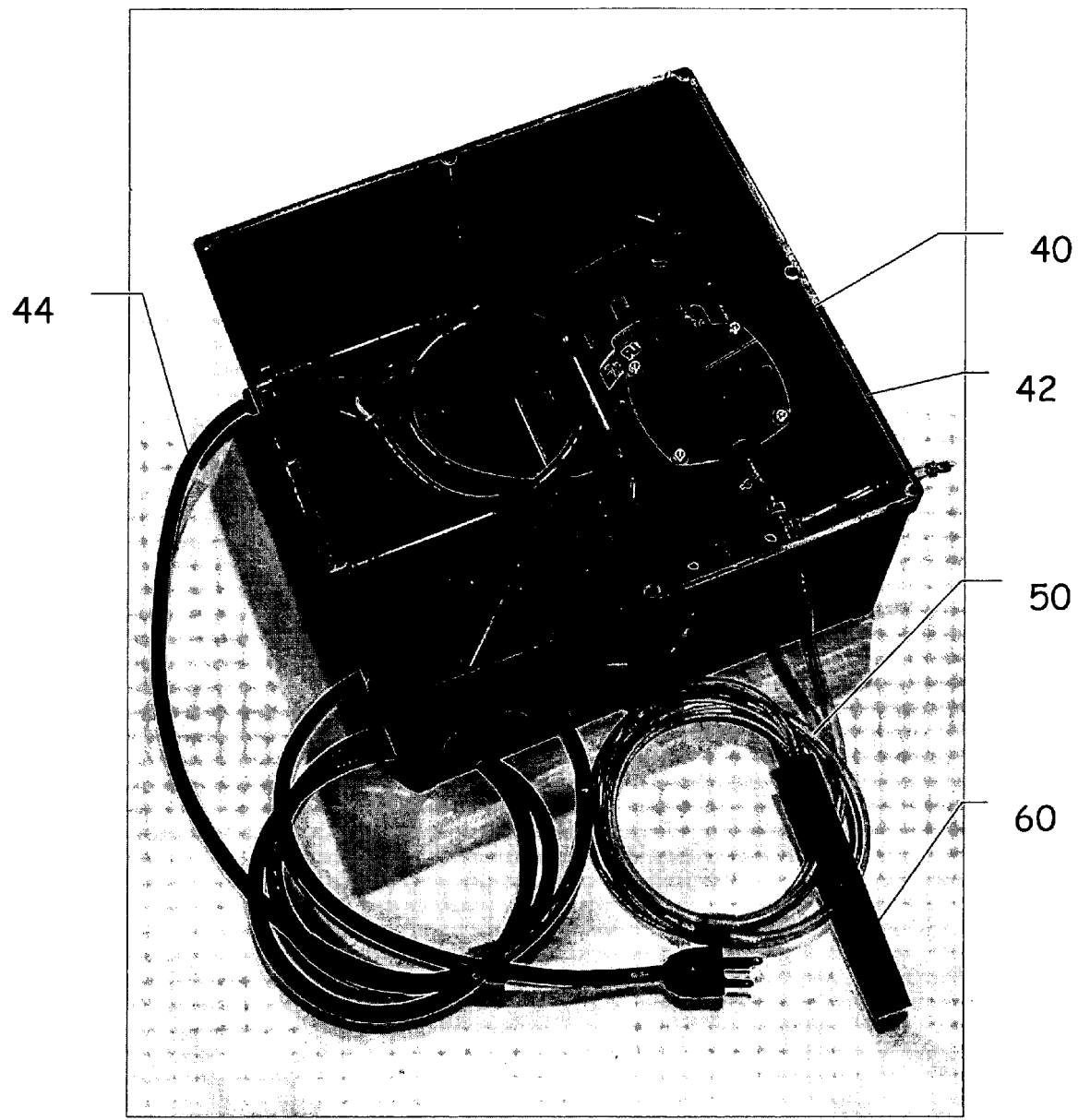
FIG. 4 is a photograph illustrating the components of an apparatus constructed in accordance with the present invention.

In general, the apparatus of the present invention is comprised of at least one high volume pump 40 connected to at least one low pressure drop sintered air stone 60. The air stone 60 has a relatively large surface area. See FIG. 4. The pumps 40 and all internal electrical connections are packaged in a weatherproof container 42. The external electrical connection 44 is connected via an extension cord to a circuit breaker or may be permanently hardwired to an electrical junction box. The pumps 40 force air into clear vinyl tubing 50, although many types of tubing are acceptable and would be within the scope of the present invention. The tubes, or aeration lines, 50 are then connected to the air stones 60, which are placed at various locations inside the septic system 10.

Figure 2:
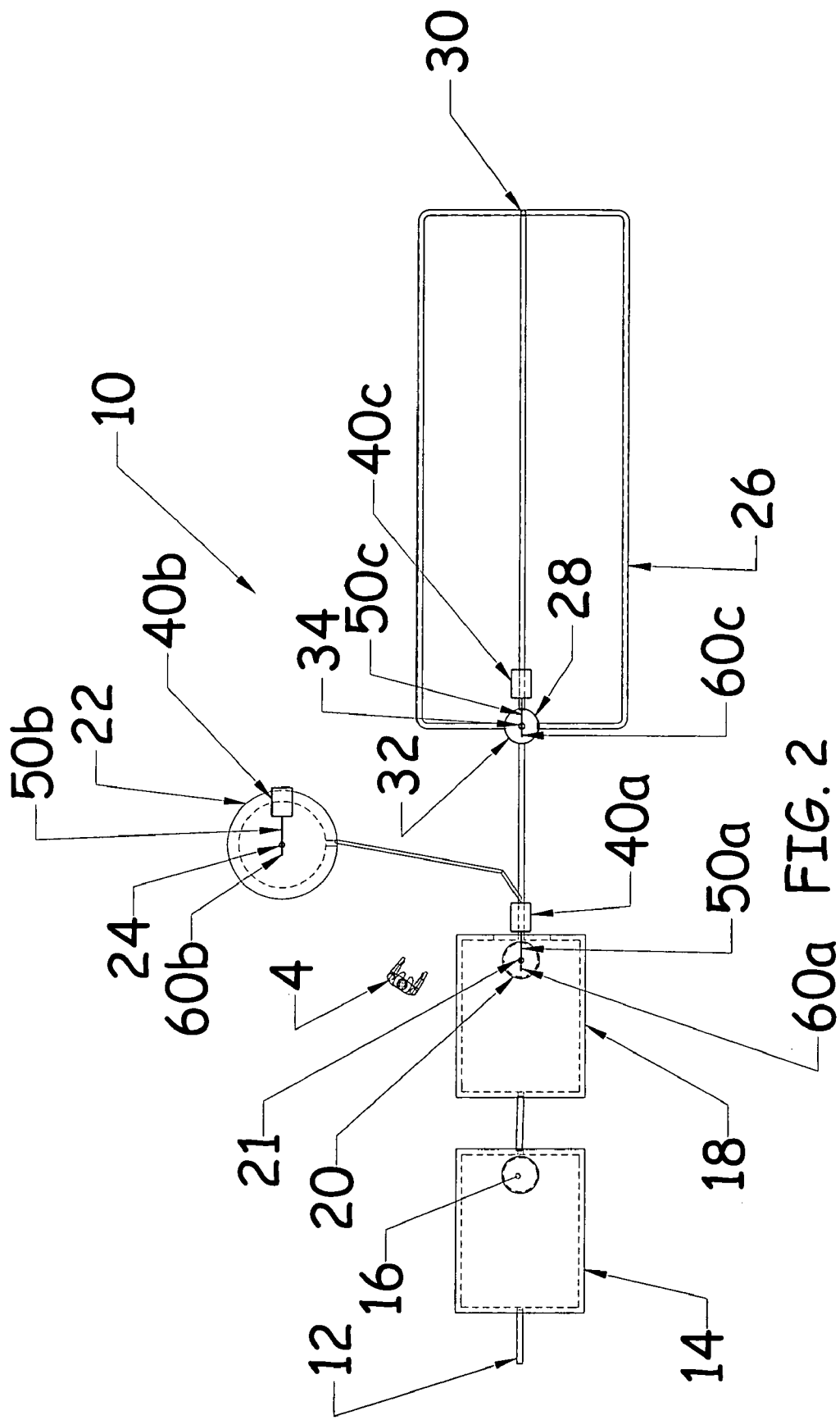
FIG. 2 is a top plan view of the system illustrated in FIG. 1.

As shown in FIG. 1, and using the system illustrated therein as representative of a typical system, the preferred location for the aeration lines 50 is in the vent pipe 34 of the distribution box 28, the vent pipe 24 of the dry well 22, or the vent pipe 21 of the second tank or pumping chamber 18. For example, as shown in FIGS. 1, 2 and 3, a first pump 40a, tubing 50a, and air stone 60a are used with the second tank 18. At that location, the first air stone 60a and a portion of the tubing 50a are inserted into the second tank 18 via the tank vent 21. A second pump 40b, tubing 50b, and air stone 60b are used with the dry well or seepage pit 22. And a third pump 40c, tubing 50c, and air stone 60c are used with the distribution box 28 of the absorption field 26. If the standing effluent level in the distribution box 28 is not of adequate depth, an alternate location should be considered. If a vent pipe or well is not available at this location, one may be installed for a rather nominal cost. In most cases, the standard vent cap can be used during remediation.

It is to be understood that the apparatus of the present invention could be installed in alternate locations. For example, the aeration lines could be installed in the final septic tank or pumping chamber of a multiple tank system or in the septic tank in a single tank system immediately prior to the outlet to the soil absorption system. As an alternate to installing through a vented cover, small holes can be drilled through the lid of the tank or compartment and the aeration lines installed. Installation of an approved effluent filter is recommended with this application method.

Remediation is a lengthy process. However, the method and apparatus of the present invention provides some degree of immediate relief quite quickly. Thereafter, the rate of remediation tapers off over time. Substantial remediation can occur in most systems within about 6 months, although other systems may require as long as one year. If, even then, the system is not completely remediated, the equipment can be operated for longer periods without detrimental effects to the system.

Depending on conditions, the introduction of approved bacteria, enzymes and vitamins may expedite the remediation process. Unfortunately, after the remediation equipment has been removed, there will be a lag of decomposition activity while the aerobic bacteria dies and the anaerobic bacteria again takes over. Many types of bacteria are available for purchase which include both aerobic, and/or anaerobic and/or facultative that can expedite the system's return to normalcy. Addition of these products is not required in the method of the present invention but may be considered to enhance performance.

In the experience of this inventor, the length of time required to remediate a failing or failed absorption field depends on several factors, including, but not limited to, system type, size, severity of failure, site conditions, precipitation, and the average temperature during the remediation process. Several trials have been conducted that show the influences of these conditions. All trials showed successful application of the remediation program. The trials showed little change in measured effluent in the absorption system during the first several days of remediation. The following weeks showed a significant drop in effluent levels. Over time, the rate of effluent reduction decays. Rapid effluent drop near the top of the absorption system is to be expected as it is not normally used until the lower levels become plugged and the effluent levels begin to rise. Daily specific hydraulic loading and local precipitation had similar effects on all systems.

In another particular application, the present invention provides for use of two Dynastar 2 Pumps 40, two 12 inch Micro-Bubble air stones 60, 20 feet of tubing 50, a pair of "tees", one tube weight, a weatherproof container 42, an extension cord 44 and a UL rated ground fault circuit interrupter, or GFCI. See also FIG. 4. All electrical connections for the pumps 40 are located inside the weatherproof container 42. An extension cord runs to a GFCI and then to the power source. The pumps 40, are generally piston pumps but any positive pressure generating pump can be used. The piston pump 40 used in this embodiment of the invention provides 0.23 CFM ($ft^3$/min) to a 3/16 inch×0.032 inch wall tubing, although other pumps of various output capacities could be used. Other sizes and types of tubing 50 would also work equally well. Additionally, several types of air stones 60 other than that specified will work. The air stones 60 are attached to the end of the tubing 50 and distribute air more effectively to wet areas.

In the opinion of this inventor, installation of the device of the present invention is relatively simple and straightforward and can frequently be accomplished by the homeowner. The user should first identify the components of his or her particular septic system. Frequently, the local government or health department will have information about the homeowner's septic system on file. However, as a general rule, home septic systems are comprised of a pipe running from the house to the septic tank, in some cases, a pipe running to a second septic tank or pumping chamber, and a typical distribution box that splits the effluent into several pipes going into the absorption field, as discussed above. With this configuration, there are several different locations in which the apparatus of the present invention can be installed to eliminate excess bio-mat. The preferred location to install the remediation equipment is as close to the bio-mat problem as possible. Therefore, in a septic system having a first septic tank 14, a second septic tank or pumping chamber 18, a dry well 22 and a distribution box 28 leading to one or more absorption field vents 30, 34, the preferred location would be in the dry well or seepage pit 22. A secondary, but still beneficial location would be to install the aerator stone 60 in the distribution box 28. However, it would also be beneficial to install the aerator stone 60 of the present invention after the second septic tank 18. Obviously, different septic systems will require slightly different installations.

In the event that a septic system 10 does not have a vent at a convenient location to monitor the progress of the remediation method, a monitoring well can be added to a conventional soil absorption system by driving a "sandpoint" well point not less than 12 inches and not more than 24 inches below the bottom of the soil absorption vent pipe 30. The bottom of the "sandpoint" should be driven to the bottom of the soil absorption field 26. Therefore, the effluent level in the "sandpoint" can then be monitored.

Figure 5:
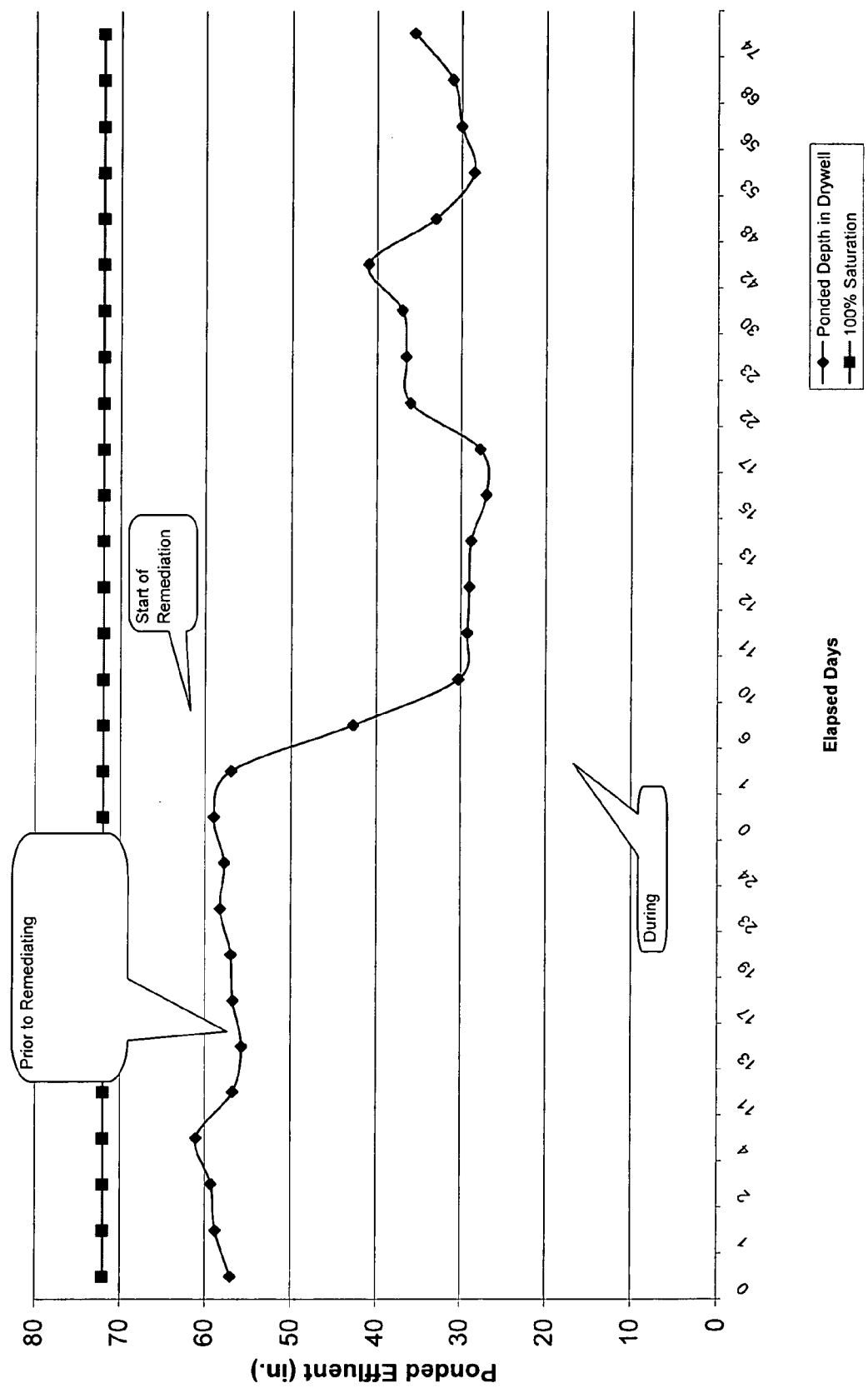
FIG. 5 is a graph illustrating ponded effluent depth versus elapsed time in a typical application using the method and apparatus of the present invention.

The remediation apparatus of the present invention should be allowed to operate for six months. If the system 10 is severely plugged, the equipment can operate for more time without damaging the septic system. The depth of the ponded effluent should be recorded regularly. Frequently, plotting the data on a program such as Microsoft® Excel will enable the user to predict the amount of time required for remediation. A good estimate of the required operating time can be obtained by examining a plot of the Ponded Effluent Depth as shown in FIG. 5. Normally, treatment should continue for two months after the ponded effluent depth stabilizes. For the system plotted in FIG. 5, the owner of the septic system might expect to operate the system a total of 120 days. The user should expect some anomalous measurements during the remediation period. For example, in FIG. 5, the ponded effluent depth in the septic system declined for several days, remained steady, and then rose again. This rise could be attributed to many things such as increased water usage and precipitation.

This equipment and process can also be applied to the effluent contained in a holding tank. In this application, the effluent category can be changed from untreated waste to treated waste. This recategorization may reduce the pumping cost associated with the holding tank. Typically, untreated waste of a holding tank must be disposed of in a waste treatment facility. The waste treatment facility charges the waste hauler for this service, who in turn charges the owner of the holding tank. Treated waste can be alternatively distributed into the surface of the ground at less cost.

Yet another application of this process and equipment is in mobile and portable holding tanks. Mobile and portable holding tanks can be found in but not limited to recreational vehicles, camping trailers, boats, etc. These holding tanks are anaerobic in nature and emit odorful methane gases. Owners typically add chemical odor controllers containing paraformaldehyde, alkyl dimethyl benzyl ammonium chloride (quaternary ammonium) or other disinfectants. These chemicals are toxic and detrimental to a private on-site wastewater treatment system. Many rural campgrounds are serviced by private on-site wastewater treatment system. Many campgrounds discourage or have banned the use of these additives. In this application, the naturally occurring aerobic bacteria can eliminate the odors of a blackwater or sewage holding tank. The equipment will keep the holding tank significantly free of sludge build up on the sidewalls and depth sensors. Application of this process to the gray water holding tank will also eliminate odor, keeps the holding tank free of sludge build up on the sidewalls and depth sensors. This treated gray water is then suitable for the use of flushing the toilet.

Based on the foregoing, it will be apparent that there has been provided a apparatus and method for introducing oxygen into a failed or failing soil absorption field for the purpose of converting the biochemical process from an anaerobic one to an aerobic one. The forced introduction of oxygen into the system allows the aerobic bacteria to scour the bio-mat, thereby working to reduce the thickness of the bio-mat and permitting the system to revert back to an anaerobic passive system as originally designed. By using the method and apparatus of the present invention, the biochemical process is altered by complete or localized conversion of the soil absorption component as above described. The apparatus of the present invention may seem quite simple in practice compared to existing aerobic systems. However, the goal of this approach to remediation is value based. The idea is to provide an inexpensive and effective alternative to replacing the absorption system of a septic system. This has been accomplished by the method and apparatus of the present invention.

The principles of my invention having been described in accordance with the foregoing, I hereby claim:

1. A method for remediating a wastewater treatment system, such system being comprised of at least one septic tank having an inlet and an outlet, and at least one absorption field wherein effluent drains from the tank outlet, wherein an accumulation of bio-mat has reduced the flow of effluent through the absorption field, which comprises the steps of
   introducing oxygen to the bio-mat,
   introducing live aerobic bacteria to the bio-mat,
   monitoring the level of effluent in the absorption field, and
   stopping the introduction of air to the effluent when the bio-mat is sufficiently reduced or made permeable.

2. The method of the claim 1 including the step of introducing live anaerobic bacteria to the system after stopping the introduction of air to the system.

3. A wastewater treatment system for carrying treating effluent comprising:
   a penultimate septic tank having an outlet;
   an ultimate septic tank having an outlet and an inlet in fluid communication with said penultimate tank outlet;
   a distribution system in fluid communication with said ultimate tank outlet;
   a leaching system in fluid communication with said distribution system;
   at least one positive pressure pump having an output;
   a tube having a first end and a second end, the first end being attached to the pump output; and
   an air stone attached to the second tube end and capable of introducing air into the effluent, wherein said effluent in said ultimate tank comprises air and the ultimate septic tank, distribution system, and leaching system comprise proliferating aerobic bacteria.

4. The system of claim 3 wherein the at least one positive pressure pump is electrically actuated to start and stop the introduction of air into the effluent and to increase and reduce the proliferation of aerobic bacteria therein.

5. The system of claim 4 wherein the at least one positive pressure pump comprises internal electrical connections that are packaged within a weatherproof container.

6. The system of claim 3 further comprising means for introducing into the effluent one or more selected from a group consisting of anaerobic bacteria, aerobic bacteria, facultative bacteria, enzymes and vitamins.

7. A wastewater treatment system for carrying treating effluent comprising:
   a penultimate holding tank having an outlet;
   an ultimate holding tank having an outlet and an inlet in fluid communication with said penultimate tank outlet;
   a distribution system in fluid communication with said ultimate tank outlet;
   a leaching system in fluid communication with said distribution system;
   at least one positive pressure pump having an output;
   a tube having a first end and a second end, the first end being attached to the pump output; and
   an air stone attached to the second tube end and capable of introducing air into the effluent, wherein said effluent in said ultimate tank comprises air and the ultimate septic tank, distribution system, and leaching system comprise proliferating aerobic bacteria.

8. The system of claim 7 wherein the at least one positive pressure pump is electrically actuated to start and stop the introduction of air into the effluent and to increase and reduce the proliferation of aerobic bacteria therein.

9. The system of claim 8 wherein the at least one positive pressure pump comprises internal electrical connections that are packaged within a weatherproof container.

10. The system of claim 7 further comprising means for introducing into the effluent one or more selected from a group consisting of anaerobic bacteria, aerobic bacteria, facultative bacteria, enzymes and vitamins.

11. The system of claim 7 wherein the holding tanks are mobile or portable tanks.

12. A method for temporarily converting a wastewater treatment system for carrying treating effluent from an anaerobic system to an aerobic system comprising the steps of:
    providing a penultimate septic tank having an outlet;
    providing an ultimate septic tank having an outlet and an inlet in fluid communication with said penultimate tank outlet;
    providing a distribution system in fluid communication with said ultimate tank outlet;
    providing a leaching system in fluid communication with said distribution system;
    providing at least one positive pressure pump having an output;
    providing a tube having a first end and a second end;
    attaching the first tube end to the pump output;
    providing an air stone, said air stone being capable of introducing air into the effluent; and
    attaching the air stone to the second tube end, wherein said effluent in said ultimate tank comprises air and the ultimate septic tank, distribution system, and leaching system comprise proliferating aerobic bacteria.

13. The method of claim 12 comprising the step of electrically actuating the at least one positive pressure pump to start and stop the introduction of air into the effluent and to increase and reduce the proliferation of aerobic bacteria therein.

14. The method of claim 12 wherein the at least one positive pressure pump comprises internal electrical connections that are packaged within a weatherproof container.

15. The method of claim 12 comprising the step of introducing into the effluent one or more selected from a group consisting of anaerobic bacteria, aerobic bacteria, facultative bacteria, enzymes and vitamins.

16. A method for temporarily converting a wastewater treatment system for carrying treating effluent from an anaerobic system to an aerobic system comprising the steps of:
    providing a penultimate holding tank having an outlet;
    providing an ultimate holding tank having an outlet and an inlet in fluid communication with said penultimate tank outlet;
    providing a distribution system in fluid communication with said ultimate tank outlet;
    providing a leaching system in fluid communication with said distribution system;
    providing at least one positive pressure pump having an output;
    providing a tube having a first end and a second end;
    attaching the first tube end to the pump output;
    providing an air stone, said air stone being capable of introducing air into the effluent; and
    attaching the air stone to the second tube end, wherein said effluent in said ultimate tank comprises air and the ultimate septic tank, distribution system, and leaching system comprise proliferating aerobic bacteria.

17. The method of claim 16 comprising the step of electrically actuating the at least one positive pressure pump to start and stop the introduction of air into the effluent and to increase and reduce the proliferation of aerobic bacteria therein.

18. The method of claim 16 wherein the at least one positive pressure pump comprises internal electrical connections that are packaged within a weatherproof container.

19. The method of claim 16 comprising the step of introducing into the effluent one or more selected from a group consisting of anaerobic bacteria, aerobic bacteria, facultative bacteria, enzymes and vitamins.

20. The method of claim 16 wherein the holding tanks are mobile or portable tanks.

* * * * *

(12) EX PARTE REEXAMINATION CERTIFICATE (9914th)
United States Patent
Holt

(10) Number: US 7,264,727 C1
(45) Certificate Issued: Oct. 29, 2013

(54) SEPTIC SYSTEM REMEDIATION METHOD AND APPARATUS

(75) Inventor: Karl K. Holt, Hartland, WI (US)

(73) Assignee: Aero-Stream, LLC, Hartland, WI (US)

Reexamination Request:
No. 90/012,303, Jul. 5, 2012

Reexamination Certificate for:
Patent No.: 7,264,727
Issued: Sep. 4, 2007
Appl. No.: 10/764,245
Filed: Jan. 23, 2004

Related U.S. Application Data

(60) Provisional application No. 60/442,446, filed on Jan. 25, 2003.

(51) Int. Cl.
*C02F 3/00* (2006.01)
*C02F 3/28* (2006.01)
*C02F 3/30* (2006.01)
*C02F 3/20* (2006.01)

(52) U.S. Cl.
CPC . *C02F 3/286* (2013.01); *C02F 3/30* (2013.01); *C02F 3/20* (2013.01)
USPC .......................................... 210/620; 210/220

(58) Field of Classification Search
None
See application file for complete search history.

(56) References Cited

To view the complete listing of prior art documents cited during the proceeding for Reexamination Control Number 90/012,303, please refer to the USPTO's public Patent Application Information Retrieval (PAIR) system under the Display References tab.

*Primary Examiner* — Sean E Vincent

(57) ABSTRACT

An apparatus and a method for the remediation of failing wastewater treatment systems, such systems being comprised of one or more septic tanks and a seepage pit, drywell, absorption field or an above grade mound system having an inlet and a plurality of outlets wherein effluent drains from the inlet to the outlet, comprises a positive pressure pump having an output, a tube having a first end and a second end, the first end being attachable to the pump output, and an air stone attachable to the second tube end. The pump is used to deliver air through the tube to the air stone. As much tube as is required is used to allow the air stone to be introduced into almost any portion of the wastewater treatment system so as to introduce air into the effluent to allow aerobic bacteria to proliferate. The apparatus could also include a plurality of such pumps, tubes and air stones, and in many combinations. The method comprises introducing oxygen to the bio-mat, introducing live aerobic bacteria to the bio-mat, monitoring the level of effluent in the absorption field or dry well, and stopping the introduction of air to the effluent when the bio-mat is sufficiently reduced or made permeable. The method could also introduce live anaerobic bacteria to the treated area after remediation equipment is removed.

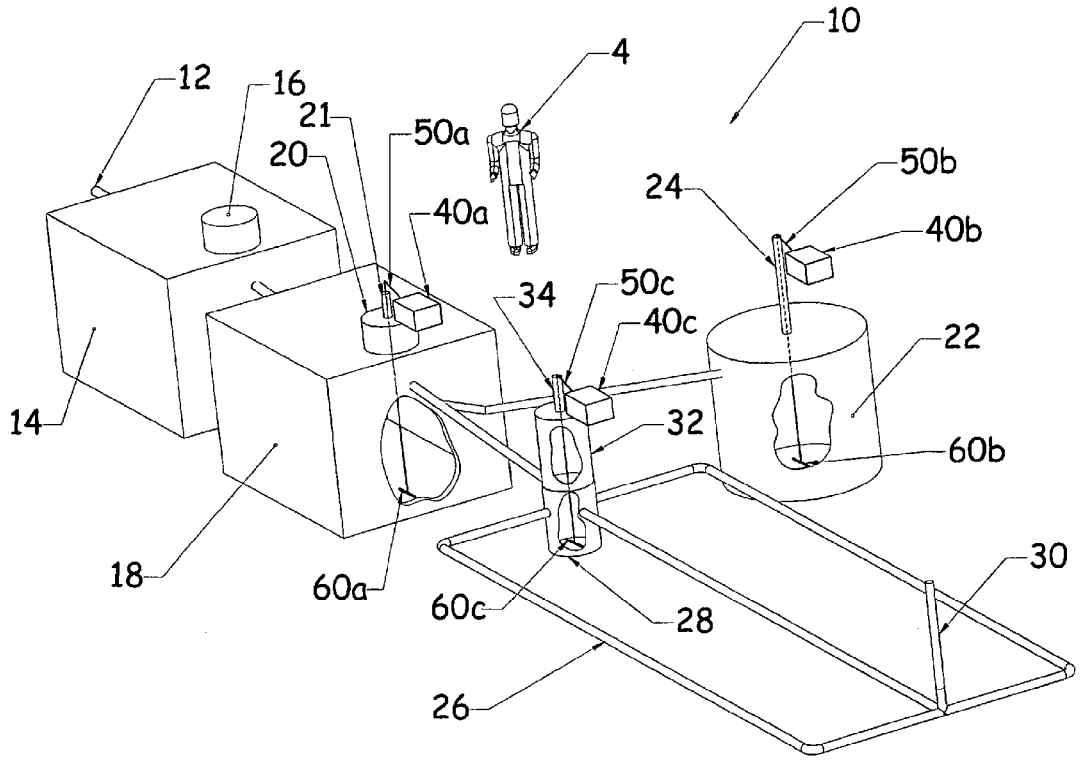

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 7, 12-14 and 16-18 are determined to be patentable as amended.

Claims 2, 4-6, 8-11, 15, 19 and 20, dependent on an amended claim, are determined to be patentable.

1. A method for remediating a wastewater treatment system, such system being comprised of at least one septic tank having an inlet and an outlet, and at least one absorption field wherein effluent drains from the tank outlet, wherein an accumulation of bio-mat has reduced the flow of effluent through the absorption field, which comprises the steps of *introducing oxygen into said at least one septic tank,* introducing oxygen to the bio-mat, introducing live aerobic bacteria to the bio-mat, monitoring the level of effluent in the absorption field *by creating a monitoring well below a top surface of the absorption field, monitoring a level of the effluent in the monitoring well,* and stopping the introduction of air [to the effluent] *into said at least one septic tank having the effluent therein* when the bio-mat is sufficiently reduced or made permeable.

3. A wastewater treatment system for carrying treating effluent comprising:
   a penultimate septic tank having an outlet;
   an ultimate septic tank having an outlet and an inlet in fluid communication with said penultimate tank outlet;
   a distribution system in fluid communication with said ultimate tank outlet;
   a leaching system *comprising an absorption field, the absorption field* in fluid communication with said distribution system;
   *a monitoring well is located below a top surface of the absorption field for monitoring a level of effluent;*
   at least one positive pressure pump having an output;
   a tube having a first end and a second end, the first end being attached to the pump output; and
   an air stone attached to the second tube end and capable of introducing air into the effluent, wherein said effluent in said ultimate tank comprises air and the ultimate septic tank, distribution system, and leaching system comprise proliferating aerobic bacteria.

7. A wastewater treatment system for carrying treating effluent comprising:
   a penultimate holding tank having an outlet;
   an ultimate holding tank having an outlet and an inlet in fluid communication with said penultimate tank outlet;
   a distribution system in fluid communication with said ultimate tank outlet;
   a leaching system *comprising an absorption field, the absorption field* in fluid communication with said distribution system;
   *a monitoring well is located below a top surface of the absorption field for monitoring a level of effluent;*
   at least one positive pressure pump having an output; a tube having a first end and a second end, the first end being attached to the pump output; and
   an air stone attached to the second tube end and capable of introducing air into the effluent, wherein said effluent in said ultimate tank comprises air and the ultimate septic tank, distribution system, and leaching system comprise proliferating aerobic bacteria.

12. A method for temporarily converting a wastewater treatment system for carrying treating effluent from an anaerobic system to an aerobic system comprising the steps of:
   providing a penultimate septic tank having an outlet;
   providing an ultimate septic tank having an outlet and an inlet in fluid communication with said penultimate tank outlet;
   providing a distribution system in fluid communication with said ultimate tank outlet;
   providing a leaching system in fluid communication with said distribution system;
   providing at least one positive *air* pressure pump having an output, *running said at least one positive air pressure pump for a period of at least six months to control a bio-mat layer, continuing to run said at least one positive air pressure pump for a period of about two months after a depth of the effluent stabilizes, ceasing to run said at least one positive air pressure pump after said about two months;*
   *repeating the process of running and stopping said at least one positive air pressure pump to control the bio-mat layer;*
   providing a tube having a first end and a second end;
   attaching the first tube end to the pump output;
   providing an air stone, said air stone being capable of introducing air into the effluent; and
   attaching the air stone to the second tube end, wherein said effluent in said ultimate tank comprises air and the ultimate septic tank, distribution system, and leaching system comprise proliferating aerobic bacteria.

13. The method of claim 12 comprising the step of electrically actuating the at least one positive *air* pressure pump to start and stop the introduction of air into the effluent and to increase and reduce the proliferation of aerobic bacteria therein.

14. The method of claim 12 wherein the at least one positive *air* pressure pump comprises internal electrical connections that are packaged within a weatherproof container.

16. A method for temporarily converting a wastewater treatment system for carrying treating effluent from an anaerobic system to an aerobic system comprising the steps of:
   providing a penultimate holding tank having an outlet;
   providing an ultimate holding tank having an outlet and an inlet in fluid communication with said penultimate tank outlet;
   providing a distribution system in fluid communication with said ultimate tank outlet;
   providing a leaching system in fluid communication with said distribution system;
   providing at least one positive *air* pressure pump having an output, *running said at least one positive air pressure pump for a period of at least six months to control a bio-mat layer, continuing to run said at least one positive air pressure pump for a period of about two months after a depth of the effluent stabilizes, ceasing to run said at least one positive air pressure pump after said about two months;*

*repeating the process of running and stopping said at least one positive air pressure pump to control the bio-mat layer;*
providing a tube having a first end and a second end;
attaching the first tube end to the pump output;
providing an air stone, said air stone being capable of introducing air into the effluent; and
attaching the air stone to the second tube end, wherein said effluent in said ultimate tank comprises air and the ultimate septic tank, distribution system, and leaching system comprise proliferating aerobic bacteria.

17. The method of claim 16 comprising the step of electrically actuating the at least one positive *air* pressure pump to start and stop the introduction of air into the effluent and to increase and reduce the proliferation of aerobic bacteria therein.

18. The method of claim 16 wherein the at least one positive *air* pressure pump comprises internal electrical connections that are packaged within a weatherproof container.

\* \* \* \* \*